United States Patent [19]

Kaneko et al.

[11] Patent Number: 5,577,164
[45] Date of Patent: Nov. 19, 1996

[54] INCORRECT VOICE COMMAND RECOGNITION PREVENTION AND RECOVERY PROCESSING METHOD AND APPARATUS

[75] Inventors: Kazue Kaneko; Keiichi Sakai, both of Kawasaki, Japan

[73] Assignee: Canon Kabushiki Kaisha, Tokyo, Japan

[21] Appl. No.: 376,913

[22] Filed: Jan. 23, 1995

[30] Foreign Application Priority Data

Jan. 28, 1994 [JP] Japan .................................. 6-008495
Jan. 28, 1994 [JP] Japan .................................. 6-008498

[51] Int. Cl.$^6$ .................. G10L 9/00; G10L 7/08
[52] U.S. Cl. ................. 395/2.84; 395/2.6; 395/825
[58] Field of Search ................... 395/2.6, 2.84, 395/825

[56] References Cited

U.S. PATENT DOCUMENTS 4,959,864  9/1990  Van Nes et al. ................... 395/2.6
5,335,313  8/1994  Douglas ............................ 395/2.84
5,345,538  9/1994  Narayannan et al. ............. 395/2.84

*Primary Examiner*—Allen R. MacDonald
*Assistant Examiner*—Tálivaldis Ivars Šmits
*Attorney, Agent, or Firm*—Fitzpatrick, Cella, Harper & Scinto

[57] ABSTRACT

Information for identifying whether a word should be recognized in the next recognition operation is stored in a recognition dictionary. This information is updated each time the recognized result is obtained in order to update the word for the next recognition, making it possible to prevent an incorrect recognition from being repeated. An indication of whether each word can be entered repeatedly is stored as identification information in the recognition dictionary. When the recognized word is a word which cannot be entered repeatedly, the identification information of the word is updated, thereby reducing the probability of incorrect recognition in the next recognition operation by excluding the word from the next recognition operation. Even when the recognized word is a word which can be entered repeatedly, the word is excluded from the next recognition operation when an instruction is issued from an instruction device. Thus, it is possible to reflect the will of the user in the recognition operation, and to decrease the probability of an incorrect recognition. The incorrect operation performed as a result of the incorrect recognition of the input information is recovered by an easy operation, and the burden on the user is lessened by preventing the repetition of an incorrect recognition operation.

18 Claims, 8 Drawing Sheets

| REPRESENTATION | JAPANESE READING | FLAG A | FLAG B |
|---|---|---|---|
| RIGHT | MIGI | C | Y |
| LEFT | HIDARI | C | Y |
| INCREASES | OHKIKU | C | Y |
| DECREASES | CHIISAKU | C | Y |
| ⋮ | ⋮ | | |
| SWITCH ON | SUITCH ON | T | N |
| SWITCH OFF | SUITCHI OFU | T | Y |
| TERMINATES | SHURYO | T | Y |
| ⋮ | ⋮ | | |

31 — REPRESENTATION
32 — JAPANESE READING
33 — FLAG A
34 — FLAG B

| JAPAN |
|---|
| HOKKAIDO |
| IWATE-KEN |
| MIYAGI-KEN |
| AKITA-KEN |
| FUKUSHIMA-KEN |
| IBARAKI-KEN |
| TOCHIGI-KEN |
| : |

1) "Tochigi-ken" Incorrectly recognized as "Miyagi-ken" →

| MIYAGI-KEN |
|---|
| ISHIMAKI-SHI |
| IWANUMA-SHI |
| KAKUTA-SHI |
| KESENNUMA-SHI |
| SIOGAME-SHI |
| SHIRAISHI-SHI |
| SENDAI-SHI |
| TAGAJOU-SHI |
| NATORI-SHI |
| FURUKAWA-SHI |

2) "Incorrect" Return to the previous menu

| JAPAN |
|---|
| HOKKAIDO |
| IWATE-KEN |
| MIYAGI-KEN |
| AKITA-KEN |
| FUKUSHIMA-KEN |
| IBARAKI-KEN |
| TOCHIGI-KEN |
| : |

3) "Tochigi-ken" Correctly recognized →

| TOCHIGI-KEN |
|---|
| ASHIKAGA-SHI |
| IMAICHI-SHI |
| UTSUNOMIYA-SHI |
| OOTAHARA-SHI |
| OYAMA-SHI |
| KANUMA-SHI |
| KUROISO-SHI |
| SANO-SHI |
| TOCHIGI-SHI |
| NIKKO-SHI |
| MAOKA-SHI |
| YASAKA-SHI |

INCORRECT VOICE COMMAND RECOGNITION PREVENTION AND RECOVERY PROCESSING METHOD AND APPARATUS

BACKGROUND OF THE INVENTION

1. Field of the Invention

The present invention relates to an input information processing method and apparatus, serving as a front end of an image processing apparatus, for recognizing vocal information and replacing the information with an action in the form of a command sequence, and executing it.

2. Description of the Related Art

Of the media used for transmitting information between human beings, vocal sounds or speech is the most commonly and naturally used. In the meantime, with the remarkable advances in the computers, not only numerical calculation, but also various other information has become to be handled by the computer. Thus, as a medium for information transmission between a human being and a computer, there is a demand to use various media, in particular, speech, rather than code information.

In response to such a demand, a voice recognition information processing apparatus for performing operations on the basis of information input in the form of speech has appeared. In a voice recognition section of such an apparatus, it is common practice that words or sentences to be recognized are prestored, the similarities between the input speech and the word or the sentence entered are calculated, and the word or the sentence having the highest similarity is regarded as the recognized result of the input speech.

However, in the recognition performance of the voice recognition section of the above-described conventional voice recognition information processing apparatus, if a vocal sound which is input once is incorrectly recognized as a different word or sentence, the same incorrect recognition is repeated even if the voice sound to be recognized is input again, which is problematical.

Meanwhile, regarding words or sentences for voice recognition which have been entered beforehand, control commands for two-state switching, such as "switch on" or "switch off", include commands, only one of which commands is entered in any state, commands, such as a "terminate" command, which cannot be entered more than once in succession because a confirmation is required for the operation instructed, and conversely commands of relative instructions, such as "to the right" or "increases", which can be entered more than once in succession. The conventional voice recognition information processing apparatus handles input situations which are different from command to command without distinguishing the input situations.

Also, there is a conventional system having input capability on the basis of information, such as speech, which is designed to reduce incorrect recognition by dynamically switching a dictionary used for recognition to vocabulary corresponding to functions which can be executed at that time to increase the number of words which can be recognized as a whole, thus improving the ease of operation.

However, in the method of dynamically switching a dictionary used for recognition, if the voice command is incorrectly recognized and executed, the dictionary used for recognition has already been switched, the voice command uttered with intention by the user is excluded from those commands to be recognized, and even if the user inputs the voice command repeatedly, the voice command will be nullified. In such a case, the user has to perform an operation for returning to the state before the incorrectly recognized command was executed. Since the operation of the system is different depending upon the command executed, returning from the result of the operation of the system after incorrect recognition is a big burden for the user.

For example, in a case in which when the user is narrowing down the items on the menu screen, a voice command uttered so as to select an item A is incorrectly recognized and an item B is selected, the incorrectly recognized submenu B has already been displayed on the screen, and the item A is not included therein. In order for the user to correctly select the item A, the user must to perform an operation for escaping from the submenu B screen and returning to the previous menu. In another example, if the user tries to scale down the window, but closes it while a certain application is executed, the window cannot be scaled down unless the file is opened once more. In another example, if the user tries to move a picture while the screen is being edited by drawing software, but the movement is incorrectly recognized and the picture is erased; to move the picture, it is necessary to recover the erased picture and move the picture.

There is also a method and apparatus which, to prevent an improper operation due to incorrect voice recognition, informs the user of the result of the voice recognition of the command input by voice and the operation is performed after the confirmation is instructed by the user.

However, prompting the user each time always necessitates two operations, inputting and confirmation of the command, to execute one command. This is very inconvenient for the user.

Regarding the words or sentences which were determined to be incorrectly recognized, there is a high possibility that the incorrect recognition is repeated since the words which were incorrectly recognized are present in the words or sentences to be recognized.

SUMMARY OF THE INVENTION

The input information processing method and apparatus of the present invention makes it possible to prevent incorrect recognition from being repeated by switching the words to be recognized for the next time by using the nature of input information obtained by the recognition.

The input information processing method and apparatus of the present invention makes it possible to reduce the probability of incorrect recognition in the next recognition operation by excluding words from the next recognition when the words of the recognition result of the input information are not input more than once in succession.

The input information processing method and apparatus of the present invention makes it possible to reflect the intention of the user in the recognition operation by excluding words from the next recognition operation when an instruction of exclusion is issued from instruction means even when the words of the recognition result of the input information are words which can be input more than once in succession. Further, by preventing the same recognition error from being repeated, it is possible to improve the voice recognition performance of the voice recognition information processing apparatus.

The input information processing method and apparatus of the present invention recovers, by an easy operation, from the incorrect operation performed as a result of the incorrect recognition of the input information, and lessens the burden of the user by preventing the repetition of incorrect recognition.

The above and further objects, aspects and novel features of the invention will more fully appear from the following detailed description when read in connection with the accompanying drawings.

DESCRIPTION OF THE PREFERRED EMBODIMENTS

[First Embodiment]

A first embodiment of the present invention will be explained below in detail with reference to FIG. 1.

Figure 1:
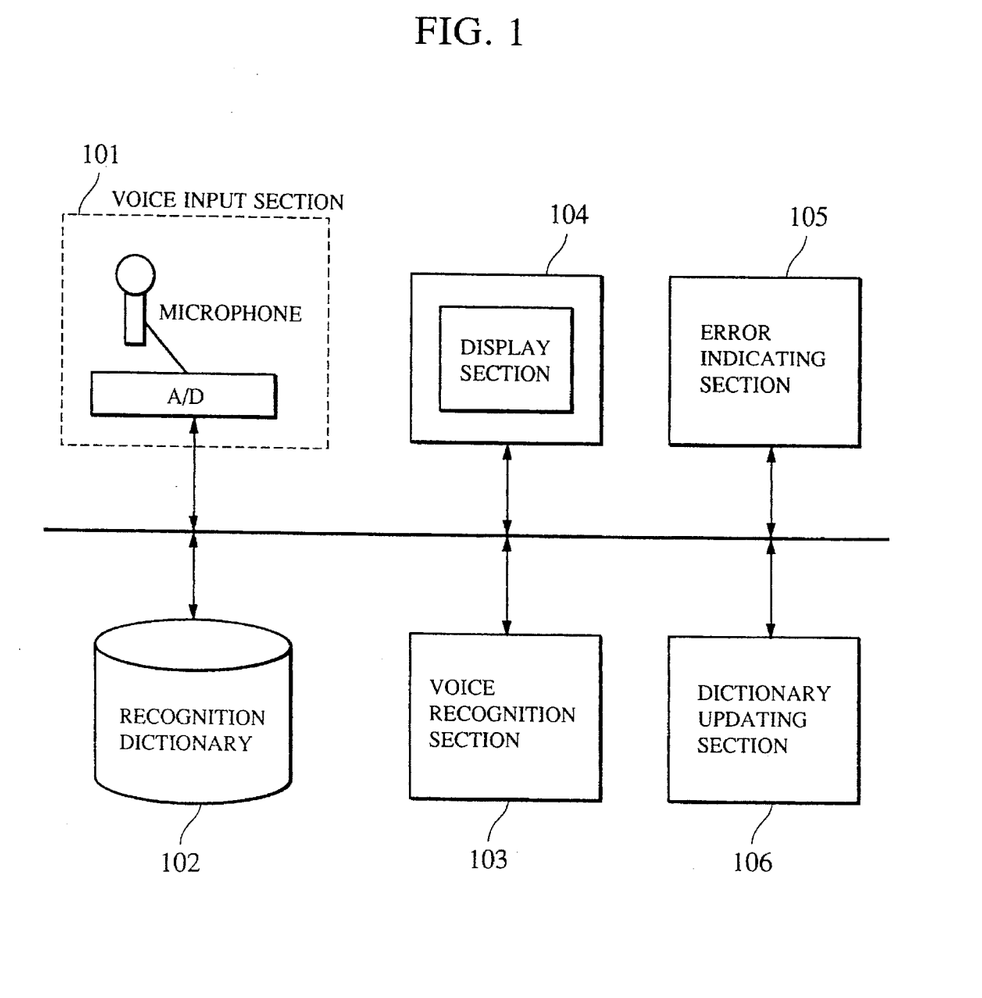
FIG. 1 is a block diagram illustrating the construction of a voice recognition information processing apparatus in accordance with a first embodiment of the present invention.
Figure 3:
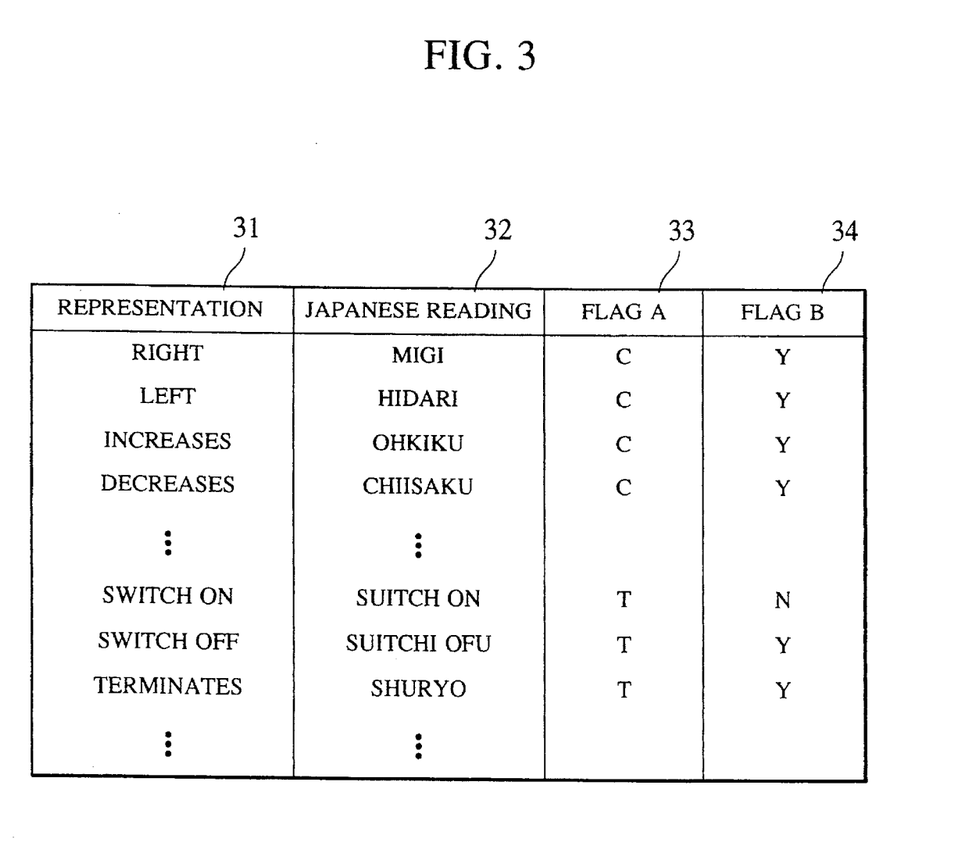
FIG. 3 illustrates the structure of a recognition dictionary in accordance with the first embodiment of the present invention.

Referring to FIG. 1, reference numeral 101 denotes a speech input section for converting voice input via a microphone from analog to digital form and inputting the digitized voice into the apparatus and holding it; reference numeral 102 denotes a recognition dictionary for storing voice patterns for each word to be matched during word recognition, representation information 31 and Japanese reading information 32 on each word, a flag A 33 indicating whether the word can be entered more than once in succession (hereinafter indicated as "C") or not (hereinafter indicated as "T") for each word, and a flag B 34 indicating whether the word can be received as the input (hereinafter indicated as "Y") or not (hereinafter indicated as "N").

Reference numeral 103 denotes a voice recognition section for performing vocal sounds recognition on voice input via the voice input section 101. The voice recognition section 103 matches the digital voice signals held by the voice input section 101 with the voice pattern for each word stored in the recognition dictionary 102 and outputs information in the dictionary on the word having the highest similarity. Reference numeral 104 denotes a display section for displaying in characters representation information 31 of the word of the recognition result in accordance with the font stored in a CGROM (character generation read only memory); reference numeral 105 denotes an error indicating section for indicating and inputting that an error has occurred in response to the display of the result recognized by the voice recognition section 103 on the display section 104; and reference numeral 106 denotes a dictionary updating section for updating the flag B 34 in the recognition dictionary 102 on the basis of the flag A 33 in the recognition dictionary 102, the recognition result of the voice recognition section 103 and an instruction input from the error indicating section 105.

An example of the contents of the voice recognition section 103 is shown in FIG. 3. Entered in the dictionary are the representation information 31 of the words to be recognized, the reading information 32, and the flag A 33 indicating whether the word can be entered more than once in succession and further the flag B 34 for indicating whether each word is permitted as the recognition result for the next time. In FIG. 3, as an example in which continuous input is possible, "to the right", "to the left", "increases" and "decreases", which are of the relative instruction type, are entered beforehand. As an example in which continuous input is not possible, "switch on", "switch off", and "terminates", which are of the type in which only one of them should be input in one state, and when the command is input, the state changes, and also commands which can be entered change, are entered beforehand. The status of the recognition dictionary, shown in FIG. 3, indicates the situation that the current recognition result is "switch on", and since the flag A 33 indicates "T", "switch on" is determined to be words which cannot be entered more than once in succession, and the value of the flag B is set at "N".

Figure 2:
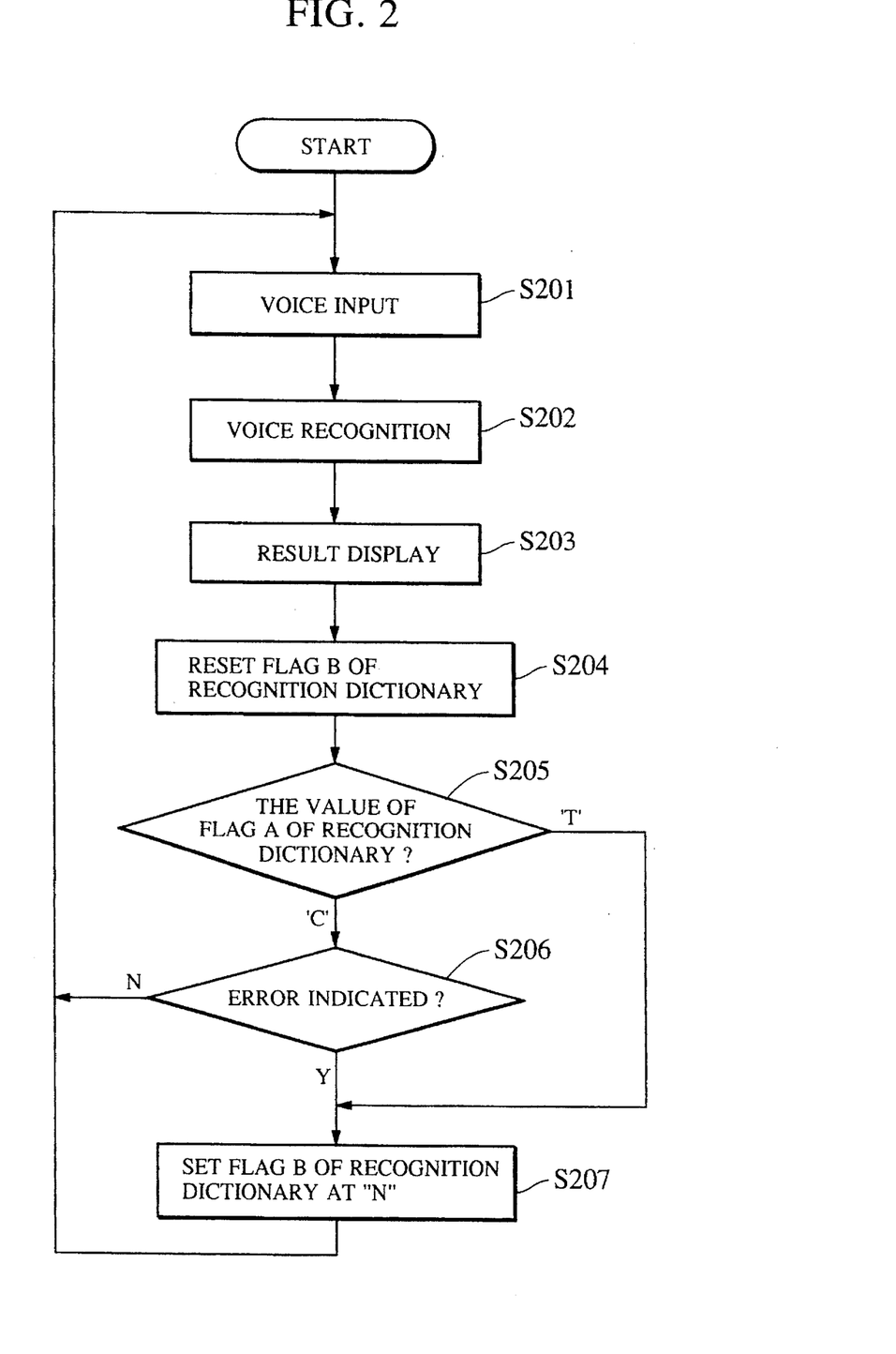
FIG. 2 is a flowchart illustrating a voice recognition information process accordance with the first embodiment of the present invention.

The operation of the voice processing apparatus constructed as described above will be explained below with reference to the flowchart of FIG. 2.

First, in step S201, the apparatus waits for an input of vocal sounds from the voice input section 101. When speech is input, the apparatus holds the input information and sends this information to the voice recognition section 103. In step S202, the voice recognition section 103 calculates the similarity of the input speech to stored words in dictionary 102 only for words which can be received as an input, i.e. words for which, the flag B 34 is "Y", by referring to the flag B 34 of the recognition dictionary 102, and performs voice recognition on the input information. Then, in step S203, the word of the recognition result determined as the word having the highest similarity to the input speech by the voice recognition section 103 is output and displayed on the display section 104 on the basis of the representation information 31, and the process proceeds to step S204.

In step S204, in order for a word which cannot be received in the voice recognition for this time to be capable of being received, the recognition dictionary 102 is referred to, and the words for which the flag B 34 is "N" are reset to "Y". In the next step S205 for updating the flag in order to be ready for the next voice recognition, if the flag A of the word is "C" when the result recognized by the voice recognition section 103 and the recognition dictionary 102 are referred to, the process proceeds to step S206. If the flag A of the word is "T", the process proceeds to step S207. If, in step S206, there is an input from the error indicating section 105 indicating that the result recognized by the voice recognition section 103 is an error, the process proceeds to step S207. If there is no such indication input, the process returns to step S201. In step S207, the flag B of the word, which is a recognition result, in the recognition dictionary 102 is set at "N", and the process returns to step S201.

As described above, when the words which cannot be entered more than once in succession become recognition results, they will be excluded automatically from the next voice recognition operation. Therefore, if the word is a recognition error, the same recognition error will not be repeated. Even if the word is not a recognition error, the word will not be incorrectly recognized as a different word because it is not input more than once in succession. Regarding the words which can be entered more than once in succession, by explicitly indicating and inputting that the word is a recognition error, the same recognition error will not occur repeatedly by excluding the word from the next recognition operation.

Although this embodiment describes a voice recognition operation in which a stored word having the highest similarity to an input word is made a recognition result, this method can be applied to a voice recognition operation in which several specific words are made recognition results from among the words having higher similarity and the user selects the correct one from among these words.

Although, in this embodiment, the word which was incorrectly recognized in the previous incorrect recognition operation is excluded from the words for recognition by referring to the recognition dictionary during a voice recognition operation, in the voice recognition operation capable of holding a plurality of recognition results, it is possible to exclude words which were incorrectly recognized by referring to the recognition dictionary on the basis of the recognition result of the voice recognition operation.

Although this embodiment describes a case in which only a single recognition dictionary is used, when a plurality of recognition dictionaries are switched and used, it is possible to refer to both the recognition dictionary used previously and the switched recognition dictionary in accordance with a recognition result and an external instruction.

In this embodiment, when a recognition error occurs, voice is input again. However, in the case of a recognition error, a recalculation can be made by using a vocal sound which was input previously without inputting the voice sound again by adding instruction means for instructing that the voice held by the holding means be recalculated.

Although, in this embodiment, subjects for voice recognition are words, this embodiment can be applied to a continuous voice recognition method based on a combination of words and sentences.

Although this embodiment describes the voice input section and the error indicating section by distinguishing their the individual functions in order to make clear them, an instruction for excluding from recognition may be input as a vocal input from the voice input section.

[Second Embodiment]

A second embodiment of the present invention will be explained below in detail with reference to FIG. 4.

Figure 4:
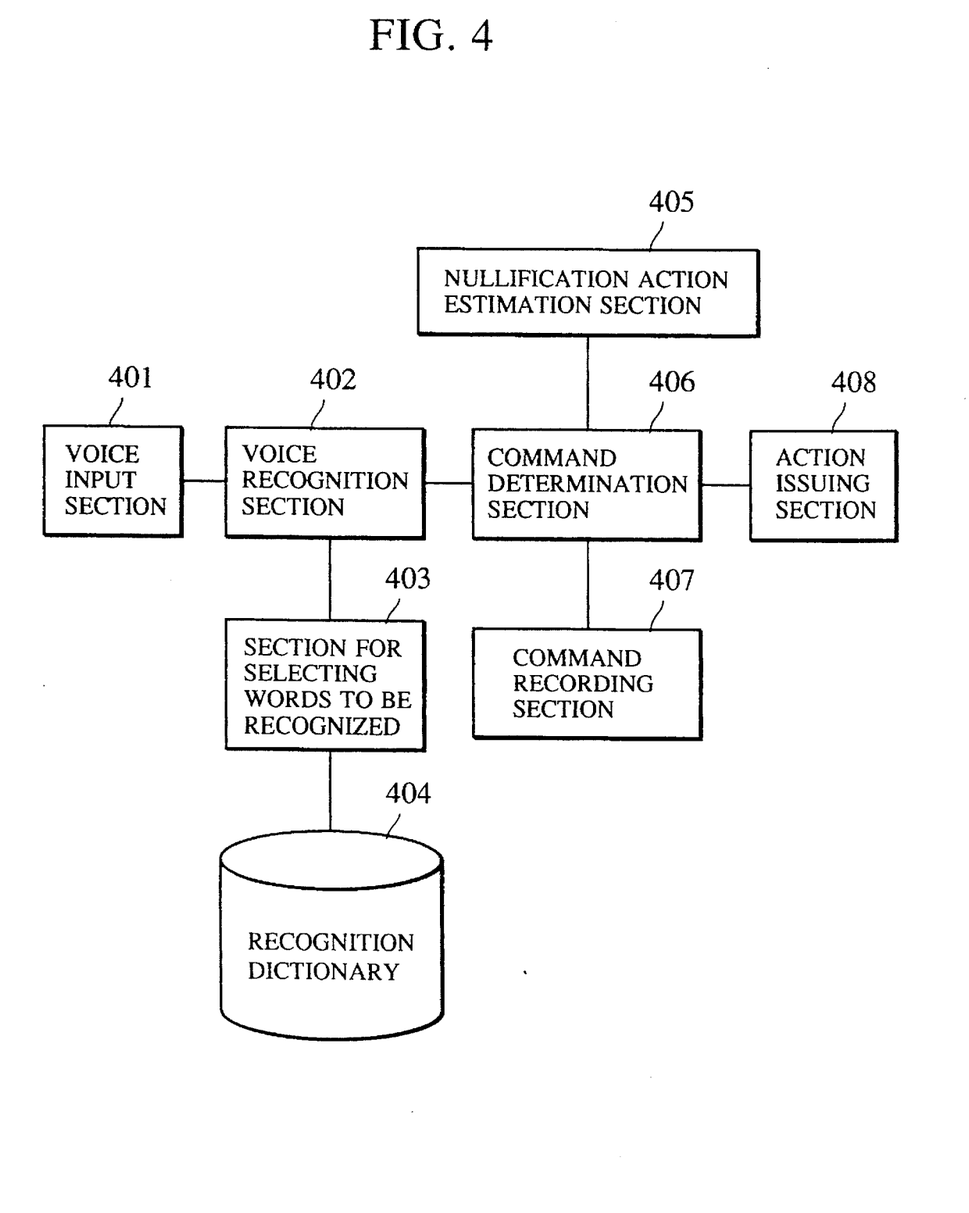
FIG. 4 is a block diagram illustrating the construction of a voice recognition information processing apparatus in accordance with a second embodiment of the present invention.

Referring to FIG. 4, reference numeral 401 denotes a voice input section; reference numeral 402 denotes a voice recognition section for recognizing a vocal input from the voice input section 401; reference numeral 403 denotes a recognition vocabulary selection section for selecting words to be recognized and switching the current recognition vocabulary; reference numeral 404 denotes a recognition dictionary for recording and holding the reading of words to be recognized, voice features, and actions of the word to be entered as a voice command; reference numeral 405 denotes a nullification action estimation section for determining an action to be performed when there is a nullification instruction; reference numeral 406 denotes a command determination section for determining whether the recognized voice command is a normal voice command or a voice command, such as "incorrect", "cancel", or "nullify", for nullifying the previous voice command, and for transferring an action corresponding to that command to an action issuing section 408; reference numeral 407 denotes a command recording section for recording commands sent from the command determination section 406; and reference numeral 408 denotes an action issuing section for issuing actions of voice commands.

More specifically, the voice input section 401 consists of analog voice input means, such as a microphone, analog voice input means via a public line, and an A/D converter for converting input analog signals to digital signals. The recognition dictionary 404 is formed of a hard disk or floppy disks which can be mounted/dismounted from the main unit of the apparatus. The voice recognition section 402, the recognition vocabulary selection section 403, the nullification action estimation section 405, the command determination section 406, the command recording section 407, the action issuing section 408 are operated in accordance with the control programs (stored in a ROM) of the flowchart shown in FIG. 5 under the control of a CPU.

Figure 5:
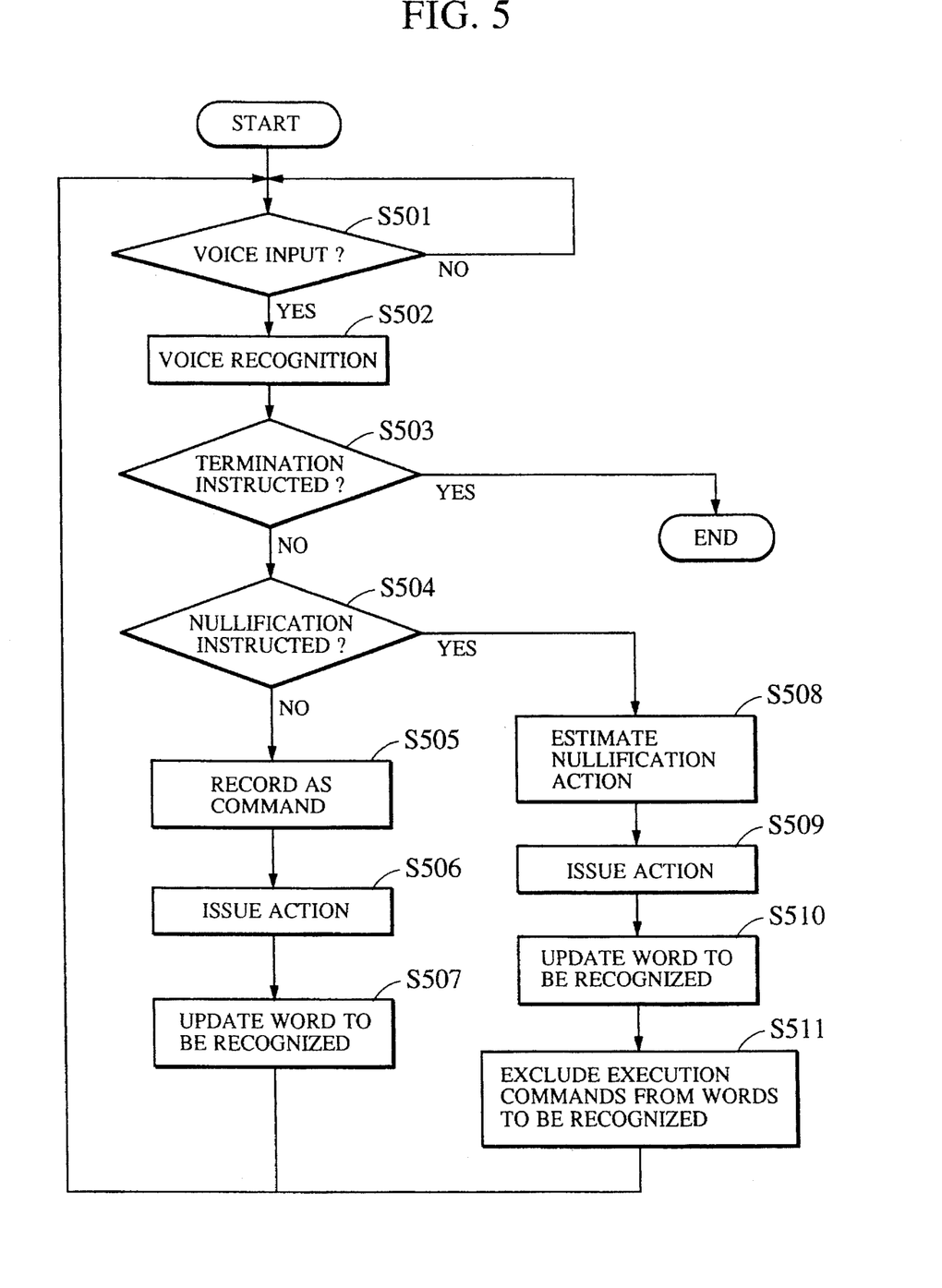
FIG. 5 is a flowchart illustrating an operation to be performed when a series of commands are input by voice in accordance with the second embodiment of the present invention.

The operation of the voice processing apparatus constructed as described above will be explained below with reference to the flowchart of FIG. 5.

First, in step S501, a check is made to determine if a vocal sound has been input from the voice input section 401. If there has been no input, the process continues to pass through the loop until a voice is input. When it is determined that a voice has been input in step S501, a voice recognition operation is performed by the voice recognition section 402 (S502). At this time, for the recognition vocabulary, the vocabulary selected from the recognition dictionary 404 by the recognition vocabulary selection section 403 is used.

In step S503, a check is made to determine if the voice command recognized in step S502 is an instruction to terminate. If it is determined that the voice command is a termination instruction, the process is terminated in response to the termination instruction. When it is determined that the voice command is not a termination instruction in step S503, a check is made to determine in step S504 if the recognized voice command recognized in steps S502 and S503 is a nullification instruction. Normal voice commands which are not a nullification instruction are commands such that actions corresponding to the commands are entered in the recognition dictionary 404 beforehand. Voice commands for instructing nullification are voice commands of given words, such as "nullify", "cancel" or "incorrect", for which an action to instruct the nullification of the voice command performed just previously need to be estimated by the voice command performed just previously.

When the input voice command is a normal voice command, that is, it is determined to be no in step 504, the process proceeds to step S505 where voice command is entered as an execution command in the command recording section 407, and the command determination section 406 also sends an action stored in the recognition dictionary 404, corresponding to the voice command, to the action issuing section 408.

In the next step S506, an action of a voice command is issued from the action issuing section 408, and the command is executed. In the next step S507, the word to be recognized which will be stored in the recognition vocabulary selection section 403 is updated as the command is executed, and the process returns to step S501 where the apparatus waits for the next input.

When the command is determined to be a nullification command in step S504 (in the case of yes), the nullification action estimation section 405 estimates in step S507 a nullification action for nullifying the immediately previous executed command which is recorded in the command recording section 407, and sends the action to the action issuing section 408 and enters the command corresponding to the action in the command recording section 407. In step S509, the nullification action is issued from the action issuing section 408 in order to nullify the command.

In the next step S510, the word to be recognized which will be stored in the recognition vocabulary selection section 403 is updated as the command is executed. In step S511, the execution command entered in the command recording section 407 in the previous step S505 is sent to the recognition vocabulary selection section 403 in order to effect control that this command is excluded from the recognition at the next recognition operation. Then, the process returns to step S501 where the apparatus waits for the next input.

Figure 6:
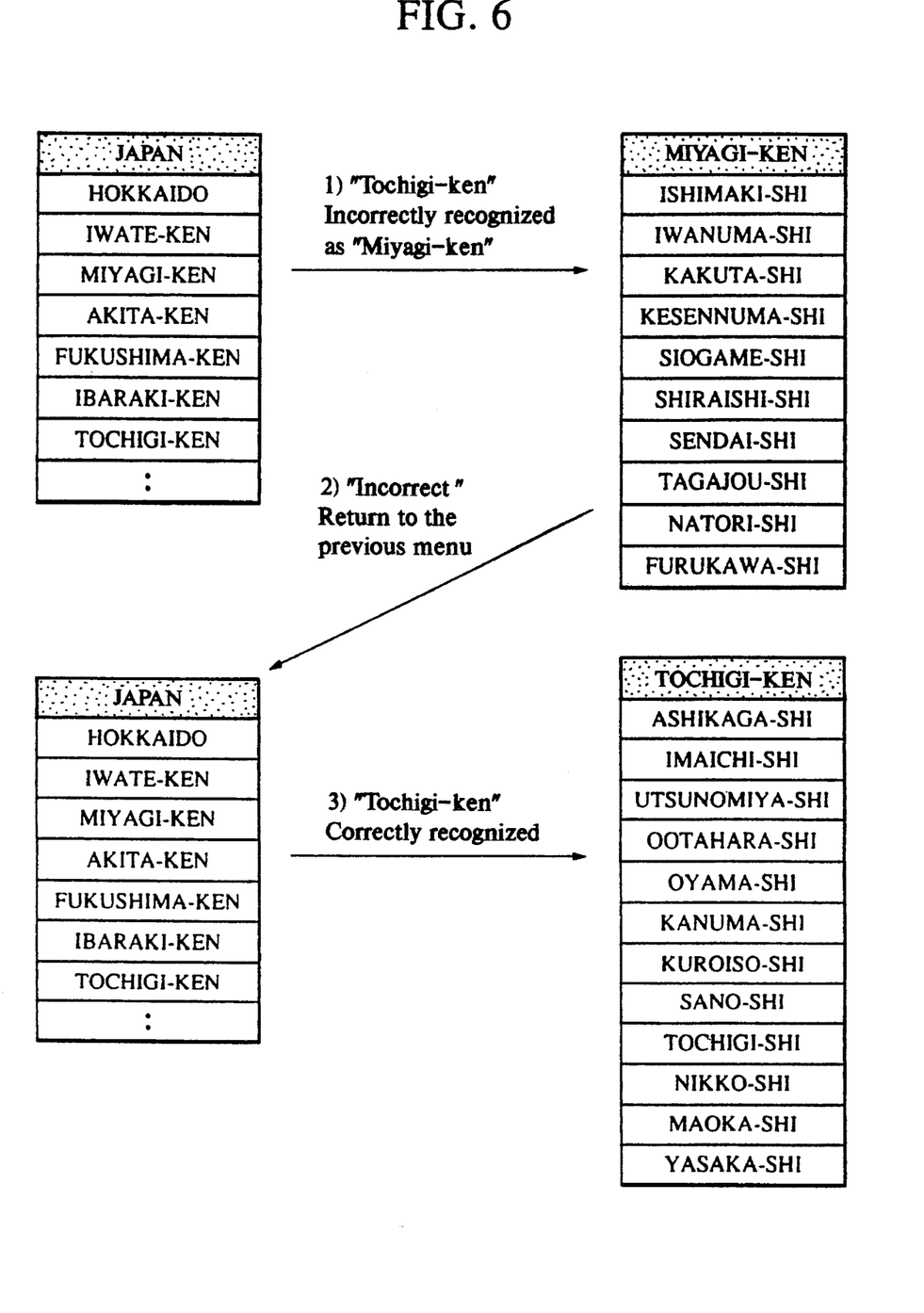
FIG. 6 illustrates the nullification of menu selection in accordance with the second embodiment of the present invention.
Figure 7:
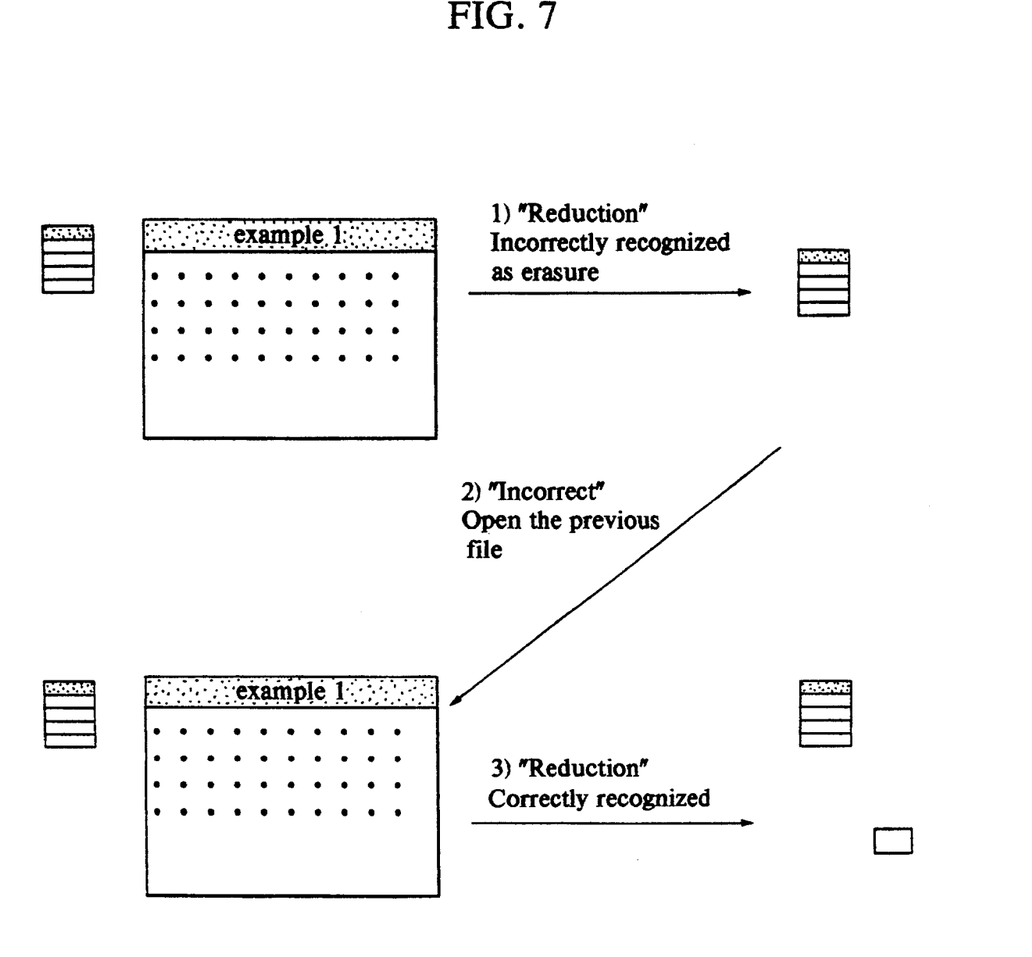
FIG. 7 illustrates the nullification of window handling in accordance with the second embodiment of the present invention.
Figure 8:
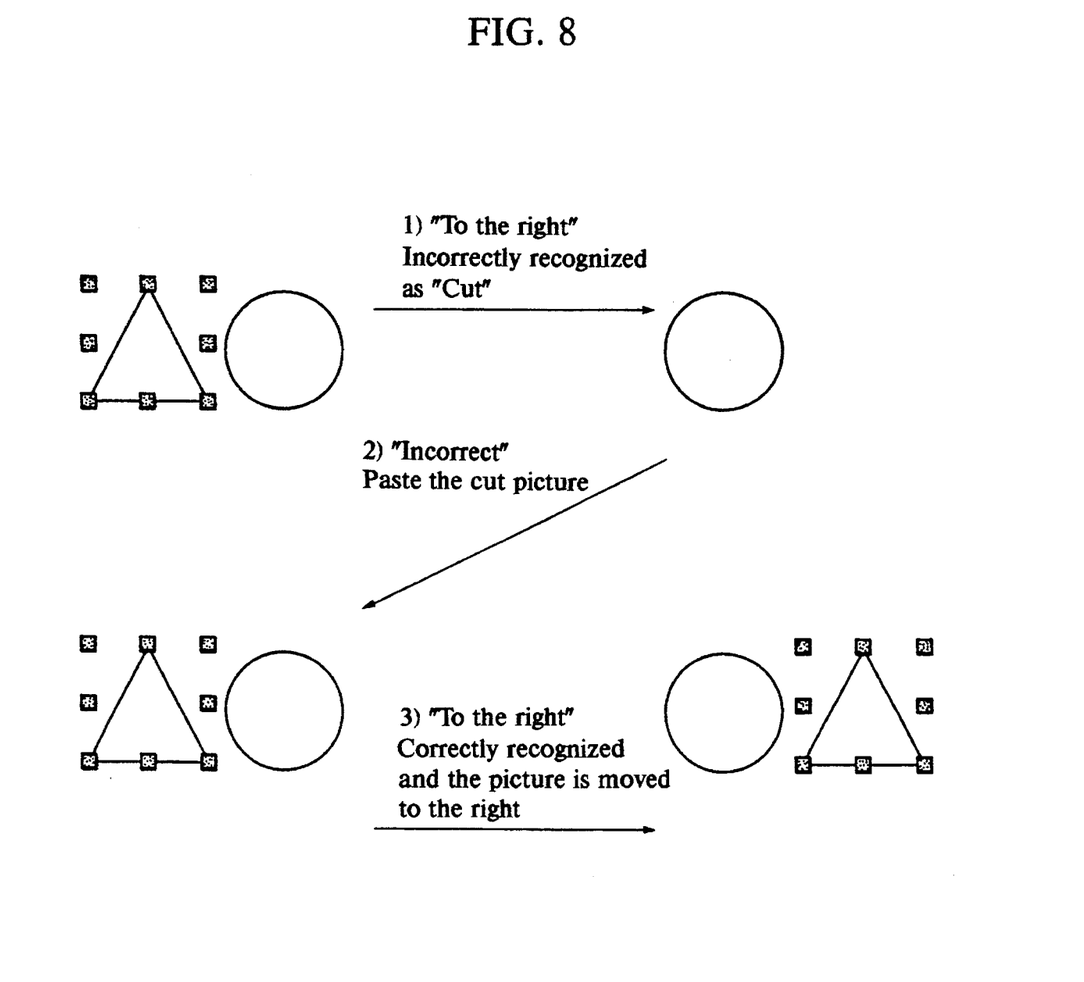
FIG. 8 illustrates the nullification of a picture editing operation in accordance with the second embodiment of the present invention.

FIGS. 6, 7 and 8 illustrate an example of the nullification operation in accordance with the second embodiment of the present invention. FIG. 6 shows an example of nullification of an incorrect recognition when the menu is selected. When a vocal sound is input as "Tochigi-ken" in 1), this is incorrectly recognized as "Miyagi-ken" and the display is switched to the display of shi (meaning cities in Japanese) of the "Miyagi-ken" of the submenu. When a voice sound is input as "incorrect" in 2), the menu returns to the original one, and the display of the items of "Miyagi-ken" incorrectly recognized is corrected so that the item cannot be selected. When a voice sound is input as "Tochigi-ken" once more in 3), this time, the submenu is switched to the display of the shi (meaning cities in Japanese) of the "Tochigi-ken".

FIG. 7 illustrates an example of the incorrect recognition in the handling of the window. When a voice sound is input as "scale down" in 1), this is incorrectly recognized as "erase", and the window is closed and erased. When a voice sound is input as "incorrect" in 2), the file displayed on the window closed just now is opened by the same application, and the previous state is made to appear. When a voice sound is input as "scale down" once more in 3), this time, the window is scaled down.

FIG. 8 illustrates an example of the nullification of a picture editing operation performed via drawing software. When a voice sound is input as "to the right" 1), this is incorrectly recognized as "cut", and the triangle is erased. When a voice sound is input as "incorrect" in 2), the triangle erased just now is pasted, and the previous state is made to appear. When a voice sound is input as "to the right" once more, this time, the triangle is moved to the right.

Although in this embodiment an action for nullification is estimated from the command executed just now, it may be stored in the dictionary by the user as a nullification action of the voice command in the same manner as the execution action of the voice command is stored.

Although in this embodiment the immediately preceding nullified voice command is excluded from the recognition vocabulary the next time, the apparatus may be returned to its original state and a nullification cancellation voice command to be added as words to be recognized may be prepared.

Also, in this embodiment, a mode may be provided in which even the immediately previous nullified voice command is not excluded from the words to be recognized for the next time, so that the words can be switched by the user.

Although in this embodiment the apparatus is returned to the state in which it existed before the incorrectly recognized voice command was executed and an input is accepted again, a capability may be provided such that the state is restored to the state before the execution and the immediately previous recognition result is presented to the user from other candidates so that it can be selected by the user.

Although in this embodiment an action is issued once more so as to return to the original state from the result of the incorrect operation, for a command such that it takes time to return to the original state or a voice command such that an action is caused to take place, which cannot be ensured to return to the original state, a method of requiring confirmation of the user before the action is issued may also be used.

Although in this embodiment a nullification instruction is performed by a voice command, such as "incorrect", this instruction may be input via a mouse or a keyboard.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications, equivalent structures and functions.

What is claimed is:

1. An input information processing apparatus, comprising:

input means for inputting vocal information;

storing means for storing words to be recognized for voice recognition and for storing first identification information indicating whether each stored word should be made a candidate for a current voice recognition operation;

recognition means for selecting words to be determined to be a candidate for voice recognition on the basis of the first identification information by referring to said storing means and for recognizing vocal information input by said input means by selecting a candidate word determined to match the input vocal information as a recognition result;

output means for outputting the recognition result of the recognition operation performed by said recognition means;

indicating means for indicating and inputting into said apparatus an indication that the selected candidate word recognized as the recognition result outputted by said recognition means is an incorrect recognition; and updating means for updating the first identification information on the selected candidate word indicated to be an incorrect recognition by changing the first identification information on the selected candidate word stored in said storing means to indicate that the selected candidate word will not be selected again in the recognition operation in accordance with an indication input from said indicating means.

2. An input information processing apparatus according to claim 1, wherein said storing means stores second identification information indicating whether each stored word can be entered more than once in succession in the voice recognition operation performed by said recognition means.

3. An input information processing apparatus according to claim 2, further comprising control means, when it is determined that a recognized word cannot be entered in the voice recognition operation more than once in succession by referring to the second identification information in said storing means, updating the second identification information so that second identification information indicates that the recognized word cannot be entered in the voice recognition operation regardless of the presence of absence of an indication from said indicating means.

4. An input information processing apparatus according to claim 1, wherein the vocal information is input over a public line into said input information processing apparatus.

5. An input information processing apparatus according to claim 1, further comprising display means for displaying characters representing the recognition result.

6. An input information processing apparatus, comprising:

input means for inputting vocal information;

storing means for storing words to be recognized for voice recognition and for storing first identification information indicating whether each stored word should be made a candidate for a current voice recognition operation;

recognition means for selecting words to be determined to be a candidate for voice recognition on the basis of the first identification information by referring to said storing means and for recognizing vocal information input by said input means by selecting a candidate word determined to match the input vocal information and a recognition result;

output means for outputting the recognition result of the recognition operation performed by said recognition means;

indicating means for indicating and inputting into said apparatus an indication that the selected candidate word recognized as the recognition, result outputted by said recognition means is an incorrect recognition; and updating means for updating the first identification information on the selected candidate word of the recognition result stored in said storing means by changing the first identification information to information indicating that the selected candidate word of the recognition result will not be selected again in the recognition operation.

7. An input information processing apparatus according to claim 6, wherein said storing means stores second identification information indicating whether each stored word can be entered more than once in succession in the voice recognition operation, and wherein the second identification information is updated so that the second identification information indicates that the selected candidate word of the recognition result will not be selected again in the recognition operation when the second identification information of the selected candidate word of the recognition result indicates that the word cannot be entered more than once in succession in the recognition operation.

8. An input information processing apparatus according to claim 6, wherein the vocal information is input over a public line.

9. An input information processing apparatus according to claim 6, further comprising display means for displaying characters representing the recognition result.

10. An input information processing method, comprising the steps of:

inputting vocal information into an information processing apparatus;

recognizing voice information input in said inputting step by storing words for voice recognition and first identification information indicating whether each stored word should be a candidate for a current voice recognition operation, and by selecting a word from the stored words, determined to be a candidate for voice recognition on the basis of the first identification information to produce a recognition result;

outputting the recognition result of the recognition operation performed in said recognizing step;

indicating and inputting into the information processing apparatus an indication that the recognition result is an incorrect recognition; and updating, in accordance with the input indication, the first identification information of the selected word indicated to be an incorrect recognition by changing the first identification information to information indicating that the selected word will not be selected again in said recognizing step.

11. An input information processing method according to claim 10, wherein said storing step stores second identification information indicating whether each stored word can be entered more than once ins succession in the voice recognition operation.

12. An input information processing method according to claim 11, further comprising the step of updating, when it is determined that a recognized word cannot be entered in the voice recognition operation more than once in succession by referring to the second identification information the second identification information so that the second identification information indicates that the recognized word cannot be entered in the voice recognition operation again regardless of the presence or absence of an indication from said indicating step.

13. An input information processing method according to claim 10, wherein said inputting step comprises the step of inputting the vocal information over a public line.

14. An input information processing method according to claim 10, further comprising the step of displaying characters representing the recognition result.

15. An input information processing method, comprising the steps of:

inputting vocal information into an information processing apparatus;

recognizing voice information input in said inputting step by storing words for voice recognition and first identification information indicating whether each stored word should be a candidate for a current voice recognition operation, and by selecting a word from the stored words determined to be a candidate for voice recognition on the basis of the first identification information to produce a recognition result;

outputting the recognition result of the recognition operation performed in said recognizing step;

indicating and inputting into the information processing apparatus an indication that the selected word of the recognition result is an incorrect recognition; and updating the first identification information of the selected word indicated to be an incorrect recognition by changing the first identification information to information indicating that the selected word of the recognition result will not be selected again in the recognition operation.

16. An input information processing method according to claim 15, wherein said storing step stores second identification information indicating whether each stored word can be entered more than once in succession in the voice recognition operation, and wherein said method further comprises the step of updating the second identification information so that the second identification information indicates that the selected word of the recognition result will not be selected again in the recognition operation when the second identification information of the selected word of the recognition result indicates that the word cannot be entered more than once in succession in the recognition operation.

17. An input information processing method according to claim 15, wherein said inputting step comprises the step of inputting the vocal information over a public line.

18. An input information processing method according to claim 15, further comprising the step of displaying characters representing the recognition result.

* * * * *

UNITED STATES PATENT AND TRADEMARK OFFICE
CERTIFICATE OF CORRECTION

PATENT NO. : 5,577,164
DATED : November 19, 1996
INVENTOR(S) : KAZUE KANEKO, ET AL.

It is certified that error appears in the above-indentified patent and that said Letters Patent is hereby corrected as shown below:

COLUMN 2:

Line 14, "to" should be deleted.

COLUMN 3:

Line 14, "accordance" should read --in accordance--.
Line 45, "speech" should read --voice--; and after "converting", "voice" should read --speech--.

COLUMN 5:

Line 46, "the" should be deleted; and "clear them," should read --them clear,--.

UNITED STATES PATENT AND TRADEMARK OFFICE
CERTIFICATE OF CORRECTION

PATENT NO. : 5,577,164
DATED : November 19, 1996
INVENTOR(S) : KAZUE KANEKO, ET AL.

It is certified that error appears in the above-indentified patent and that said Letters Patent is hereby corrected as shown below:

<u>COLUMN 6</u>:

Line 52, "voice" should read --the voice--.

<u>COLUMN 9</u>:

Line 2, "presence of" should read --presence or--.

<u>COLUMN 10</u>:

Line 17, "ins" should read --in--

Signed and Sealed this

First Day of April, 1997

Attest:

BRUCE LEHMAN

Attesting Officer

Commissioner of Patents and Trademarks